(12) United States Patent
Furuyama

(10) Patent No.: US 7,647,638 B2
(45) Date of Patent: Jan. 12, 2010

(54) APPARATUS AND A METHOD FOR PREVENTING UNAUTHORIZED USE AND A DEVICE WITH A FUNCTION OF PREVENTING UNAUTHORIZED USE

(75) Inventor: Junko Furuyama, Tokyo (JP)

(73) Assignee: Panasonic Corporation, Osaka (JP)

( * ) Notice: Subject to any disclaimer, the term of this patent is extended or adjusted under 35 U.S.C. 154(b) by 726 days.

(21) Appl. No.: 10/943,879

(22) Filed: Sep. 20, 2004

(65) Prior Publication Data
US 2005/0071635 A1 Mar. 31, 2005

(30) Foreign Application Priority Data
Sep. 25, 2003 (JP) .............................. 2003-333085

(51) Int. Cl.
G06F 7/04 (2006.01)
G06F 17/30 (2006.01)
G06F 21/00 (2006.01)
H04N 7/16 (2006.01)

(52) U.S. Cl. ............................. 726/26; 726/27; 726/30; 713/182; 713/186

(58) Field of Classification Search ................. 713/186; 726/26
See application file for complete search history.

(56) References Cited

U.S. PATENT DOCUMENTS

| 5,229,764 A | * | 7/1993 | Matchett et al. ............. 340/5.52 |
| 6,193,153 B1 | * | 2/2001 | Lambert ...................... 235/380 |
| 6,434,403 B1 | * | 8/2002 | Ausems et al. ............ 455/556.2 |
| 6,554,705 B1 | * | 4/2003 | Cumbers ...................... 463/29 |
| 2002/0095586 A1 | | 7/2002 | Doyle et al. |
| 2002/0184538 A1 | | 12/2002 | Sugimura et al. |
| 2006/0087834 A1 | * | 4/2006 | Houts et al. ................. 362/145 |

FOREIGN PATENT DOCUMENTS

| EP | 1202228 A1 | * | 5/2002 |
| JP | 2000-242786 | | 9/2000 |
| JP | 2000-259828 | | 9/2000 |
| JP | 2002-44727 | | 2/2002 |

OTHER PUBLICATIONS

Fabian Monrose et al., "Keystroke dynamics as a biometric for authentication", Future Generations Computer Systems, Elsevier Science Publishers, Amsterdam, NL, vol. 16, No. 4, Feb. 2000, pp. 351-359.

* cited by examiner

Primary Examiner—Kimyen Vu
Assistant Examiner—Randal D Moran
(74) Attorney, Agent, or Firm—Wenderoth, Lind & Ponack, L.L.P.

(57) ABSTRACT

An authentication section comparing a characteristic included in a user's input into an input section with a characteristic of a person registered in memory, to determine an authentication result. An authentication control section including a function for (i) storing a value indicating a likelihood of being the person, (ii) controlling the value indicating a likelihood of the user being the person, based on (i) the authentication result of the authentication section and (ii) a passage of time. In response to an instruction to begin a process which requires authentication, the authentication control section controls whether or not to permit execution of the process depending on a the stored value Thus, unauthorized use of a device is prevented, while the trouble of asking a user to make a special input for authentication is resolved when a process requiring authentication is executed.

22 Claims, 8 Drawing Sheets

APPARATUS AND A METHOD FOR PREVENTING UNAUTHORIZED USE AND A DEVICE WITH A FUNCTION OF PREVENTING UNAUTHORIZED USE

BACKGROUND OF THE INVENTION

1. Field of the Invention

The present invention relates to an art which is mounted on an information processing device such as a portable device (e.g., cell phone and PDA) and a personal computer and prevents unauthorized use by authenticating whether or not a user trying to execute various processes using the device is a person who is authorized to use it.

2. Background of the Related Art

Recently, under study is provision of various services using a portable device by mounting, on the portable device, a chip or card that realizes a so-called IC card function. For example, a user will be able to use various services by having a user's own portable device mounted with an IC card that communicates with a service terminal provided with an IC card reader/writer. The various services including e-money transaction processes, bonus point service processes accompanying purchase of products or the like, fare adjustment processes at gates of transportation facilities, entry processes by e-ticket, and management processes of entry/exit or attendance record.

Such a chip or card that realizes an IC card function is configured such that programs and important data are concealed in a IC chip and important information as well as a key or logic to access that information cannot be seen by an unauthorized device. The chip or card can encrypt and store important information such as credit card data, e-ticket data, or the like.

While important information stored as above cannot be accessed from an unauthorized device, if an unauthorized user (other than the person) once obtains a portable device mounted with an IC card or IC card function, the unauthorized user can use services provided, based on this important information. Moreover, since a portable device needs frequent charging, it is often left, for example, on a table in an office while being connected to the power. In this case, even if a user does not lose the portable device, it becomes highly likely that the above-mentioned unauthorized use would occur.

A portable device holds not only important information related to e-commerce or the like, but also information related to privacy such as an address book, schedule, incoming and outgoing emails, or records of incoming and outgoing calls. There are a growing number of requests for wanting to avoid a user, other than the person, who dishonestly sees such information stored in a portable device.

Under such circumstances, various mechanisms to prevent unauthorized use are under study. A popular mechanism is password authentication. Recently, a cell phone mounted with a fingerprint authentication device has been commercialized. Japanese Patent Laid-Open Application No. 2002-44727 discloses an art to allow, by way of fingerprint authentication, an operation that lifts a restriction of a communication control section. Also suggested is an art of performing authentication by combining results obtained from various authentication methods. For example, Japanese Patent Laid-Open Application No. 2000-242786 describes an art to judge whether a user is the person or not by determining probabilities of the user's being the person using two or more authentication methods respectively and by determining a logical value from each result. Japanese Patent Laid-Open Application No. 2000-259828 describes an art to judge whether a user is the person or not using two or more authentication methods respectively and decides that the user is the person when all the authentication methods judge that the user is the person.

A known art to prevent unauthorized use is to authenticate in order to unlock a locked process when a user tries to execute the locked process in an information processing apparatus. With such art, a user who wants to protect important or privacy-related information needs to set a lock so that an application to receive services using such information or an application to view such information cannot be started or executed unless authentication is successful. Locking can prevent another person's unauthorized use, but since a special operation for authentication (e.g., inputting password, and pressing a finger on a fingerprint authentication device) is required whenever the person wants to use the device, it is troublesome and takes a longer time to start a desired application due to a process time required for authentication.

If it is possible to continuously confirm by some means whether a user using an information processing device is the person or not, the user will be free of trouble of being asked for a special operation for authentication when the user wants to use some services or information. However, such a continuous authentication is difficult, especially when the information processing device is a portable device, because of the way it is used and its physical restrictions. Therefore, it is required to devise when to conduct authentication, how to prevent unauthorized use during a period that a user is not being authenticated, or the like.

BRIEF SUMMARY OF THE INVENTION

In view of the above-mentioned background, an object of methods and systems consistent with the invention is to provide a system that can protect an information processing device from unauthorized use by others so as to reduce user's trouble of being asked for a special operation for authentication without putting too much load on processing capacity of the information processing device due to the authentication.

An apparatus for preventing unauthorized use related to the invention comprises: an authentication unit that compares a characteristic included in a user's input into a device with a registered characteristic of a person to determine, as an authentication result, a likelihood of the user's being the person; a memory for storing a value that is determined, based on an authentication result by the authentication unit, and indicates a likelihood of being the person; a first controller that controls a value indicating a likelihood of being the person which is to be stored in the memory, based on an authentication result determined by the authentication unit from a user's input including input other than input done in response to an input request for authentication, and based on a passage of time; and a second controller that, in response to an instruction to begin a process which requires authentication, refers to a value indicating a likelihood of being the person and stored in the memory and controls whether or not to permit execution of the process instructed to begin depending on whether or not the referred value is a certain threshold or more.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DETAILED DESCRIPTION OF THE INVENTION

Figure 1:
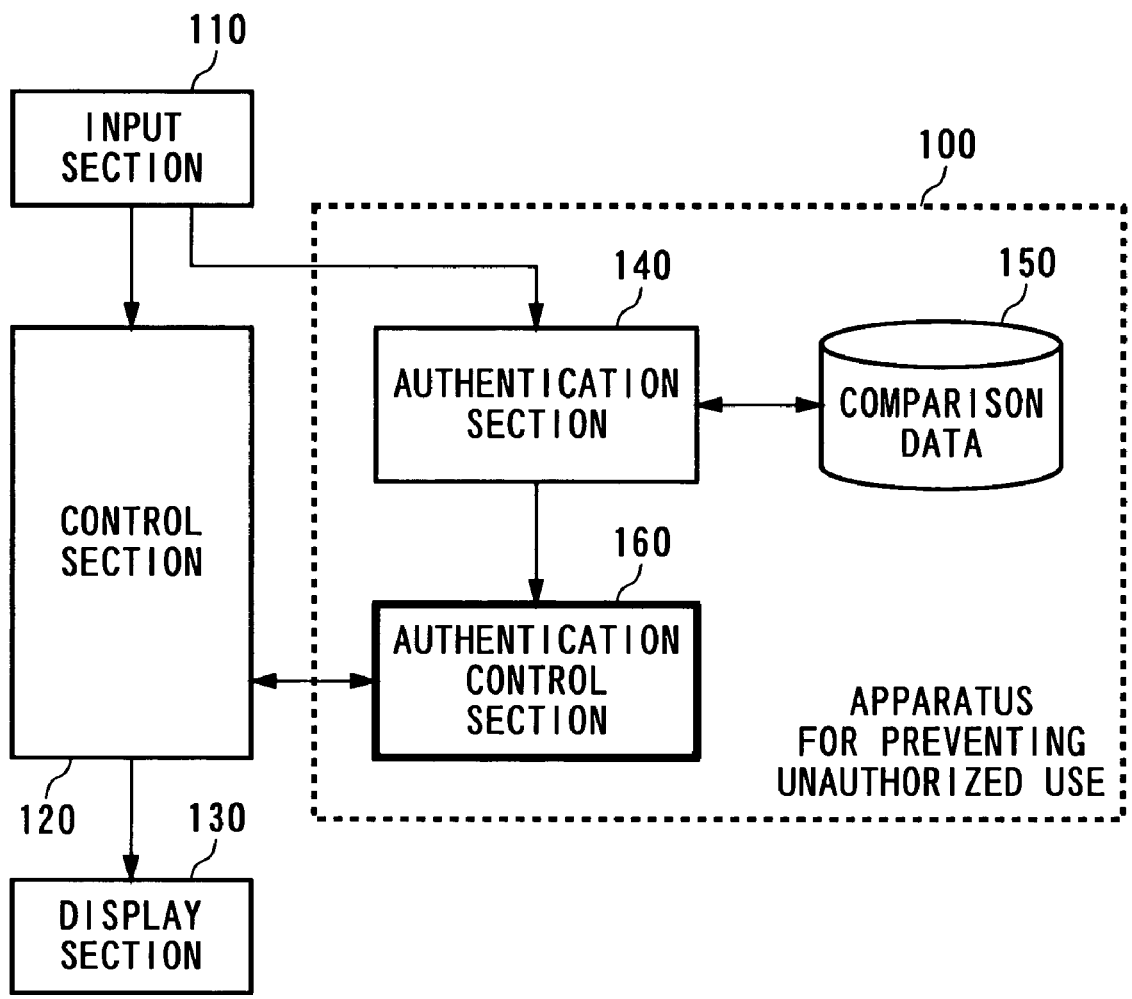
FIG. 1 shows an inner configuration example of a portable device related to an embodiment.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

An apparatus for preventing unauthorized use related to the embodiment comprises an authentication unit that compares a characteristic included in a user's input into a device with a registered characteristic of a person to determine, as an authentication result, a likelihood of the user's being the person; a memory for storing a value that is determined based on an authentication result by the authentication unit and indicates a likelihood of being the person; a first controller that controls a value indicating a likelihood of being the person which is to be stored in the memory, based on an authentication result determined by the authentication unit from a user's input, including an input other than the input done in response to an input request for authentication, and based on a passage of time; and a second controller that, in response to an instruction to begin a process which requires authentication, refers to a value indicating a likelihood of being the person and stored in the memory and controls whether or not to permit execution of the process instructed to begin depending on whether or not the referred value is a certain threshold or more.

In this embodiment, the input other than input done in response to an input request for authentication (e.g., a fingerprint of a user's finger that touched a button provided with a built-in fingerprint authentication device when the user used the button to operate the device, a voice of a user inputted to a microphone when the user used a voice phone via the device or made a voice command to the device, and an image of a user captured by a camera facing towards the user when the user operates the device) is used for authentication. This allowable authentication is to be performed by making use of a user's spontaneous operation of a device. Thus, a user's trouble of being asked for a special operation for authentication can be reduced. This configuration also pays attention to a fact that a likelihood of a user's still being the authenticated person now will change as time passes after the authentication, and updates a value indicating a likelihood of being the person based on the authentication result as well as a passage of time. Therefore, without having the device continuously authenticate, a value indicating a likelihood of being the person can be held at somewhat appropriate level. In another words, unauthorized use can be prevented without bothering a user even without putting too much load on processing capacity of an information processing device due to authentication.

In the apparatus for preventing unauthorized use related to the embodiment, the second controller may be configured such that it refers to a value indicating a likelihood of being the person and stored in the memory, without requesting a user to input for authentication when instructed to begin a process which requires authentication, and requests a user to input for authentication without permitting execution of the process instructed to begin if the referred value is lower than the certain threshold.

In this configuration, when starting a process requiring authentication, if a value indicating a likelihood of being the person held as above is a certain threshold or more, authentication is considered successful (sometimes referred to herein as "considered authentication") and execution of the process can be permitted, even if any input for authentication has not been done. This considered authentication also contributes to realizing the prevention of unauthorized use without bothering a user, because it avoids a situation that requires a user to intentionally conduct an exclusive operation for authentication.

In the apparatus for preventing unauthorized use related to the embodiment, the first controller may be configured such that it makes the authentication unit determine an authentication result using, as a user's input, an input to be used by the device for a purpose other than authentication or an input accompanying a user's action for a purpose other than authentication.

In this configuration, when an input to be used by the device for a purpose other than authentication (referred to as the "original purpose" for convenience sake) is made as a user's input, while a process for the original purpose is being executed using the input (e.g., pushing of the button by a finger) on the one hand, authentication can be performed using the input (e.g., a fingerprint of a finger that touched the same button) using the other hand (sometimes referred to herein as "back authentication"). Similarly, when an input accompanying a user's action for a purpose other than authentication ("original purpose") is made as a user's input, while the action (e.g., supporting the back of a portable device with a finger to hold the device in the hand) is serving the original purpose on the one hand, authentication can be performed using the accompanying input (e.g., a fingerprint of a finger that touches the supported area) on the other hand ("back authentication"). Based on a result of such "back authentication," a value indicating a likelihood of being the person held as above is updated from time to time (sometimes referred to herein as "continuous authentication"). Thus, a value indicating a likelihood of being the person used for "considered authentication" can be kept more appropriately.

In the apparatus for preventing unauthorized use related to the embodiment, the first controller may be configured such that it decreases a value indicating a likelihood of being the person which is to be stored in the memory as time passes while an authentication result by the authentication unit is not obtained, and, if an authentication result by the authentication unit is obtained, increases, maintains, or decreases a value indicating a likelihood of being the person which is to be stored in the memory in accordance with the obtained authentication result.

In this configuration, a value indicating a likelihood of being the person can be appropriately maintained by decreasing the value as time passes, while a result of "back authentication" is not obtained. However the above-mentioned "back authentication" is to be performed even with an input made by a user without realizing that it would be used for authentication so that the timing of it cannot be decided in advance. A value indicating a likelihood of being the person used for "considered authentication" can be kept more appropriately by increasing or maintaining the value when a likelihood of being the person shown in a result obtained by "back authentication" is high, and by decreasing the value more drastically than a decrease based on a passage of time when a likelihood of being the person shown in a result of "back authentication" is low (a likelihood of being another person is high). Incidentally, when a value indicating a likelihood of being the person is to be kept low, such as when a user leaves the device behind, a means to decrease the value according to a user's instruction may be provided separately so that the value can be decreased explicitly without waiting for a passage of time or a result of "back authentication."

In the above-mentioned apparatus for preventing unauthorized use, the first controller may make the authentication unit determine an authentication result every time a user's input with which the authentication unit can authenticate is made.

In this way, the above-mentioned "back authentication" can be made to perform frequently. Thus, a value indicating a likelihood of being the person will be more accurate. For example, when another person performs, on the device, an operation which can be used for "back authentication" and, if the device is configured to authenticate every input, then it can detect, early on, a high likelihood of use by others and drastically decrease the value indicating a likelihood of being the person, so that a high level of safety can be achieved.

In the above-mentioned apparatus for preventing unauthorized use, the first controller may make the authentication unit determine an authentication result if a user's input, with which the authentication unit can authenticate, is made when a certain time period has passed after an authentication result by the authentication unit was previously obtained.

In this way, the above-mentioned "back authentication" can be made to perform less frequently than the configuration that authenticates every input. Thus, a processing power or battery of the device used for authentication can be made small. However, during the certain time period, "back authentication" would not be performed even when another person performs, on the device, an operation which can be used for "back authentication," so a value indicating a likelihood of being the person would decrease only by an amount associated with the passage of time, and a level of safety may become lower than the configuration that authenticates every input.

In the above-mentioned apparatus for preventing unauthorized use, the first controller may make the authentication unit determine an authentication result if a user's input with which the authentication unit can authenticate is made when a value indicating a likelihood of being the person and stored in the memory is lower than a desired threshold.

Also in this way, the above-mentioned "back authentication" can be made to perform less frequently than the configuration that authenticates every input. Thus, a processing power or battery of the device used for authentication can be made small. A state where a value indicating a likelihood of being the person is lower than a desired threshold means a state where a desired application cannot be started or executed unless an input for authentication is made. Thus, this configuration accommodates a request to keep the application usable at all times as long as a user is the person.

In the apparatus for preventing unauthorized use related to the embodiment, the first controller, based on a certain function, may decrease a value indicating a likelihood of being the person which is to be stored in the memory as time passes while an authentication result by the authentication unit is not obtained. Further, the second controller may compare a value indicating a likelihood of being the person and stored in the memory with, as the certain threshold, a threshold for a service to be conducted by the process instructed to begin, out of thresholds set for every service that the device provides. Furthermore, at least one of the thresholds for every service and the certain function may be determined such that an amount of time that a value indicating a likelihood of being the person and stored in the memory takes to decrease to a level at which execution of a process for each service is refused due to not obtaining an authentication result by the authentication unit is in accordance with safety required for each service.

In this way, while a result of "back authentication" is not obtained, as a value indicating a likelihood of being the person decreases based on a certain function and with a passage of time, use of each service can be limited in order, starting from the one requiring the highest level of safety. A kind of service may include not just a service provided by the device, for example, via communication with a service terminal, but also the device's execution of an application, for example, to read privacy-related information. Assuming that a required level of safety is high (i.e., requiring that execution is not permitted unless a user is identified to be the person with a high certainty) in order of a transaction process, an email reading process, and a ticket gate process, a relationship between the thresholds for every service and the certain function may be set such that a value indicating a likelihood of being the person becomes lower than a level required for permission of the transaction process, the reading process, and the ticket gate process in three, ten, and thirty minutes, respectively. The thresholds for every service may also be set by a user if the service is for viewing privacy-related information. If a service is provided, via communication with a service terminal, they may be set by the service provider, or an optional threshold which is higher than the one set by the service provider may be set by a user.

In the apparatus for preventing unauthorized use related to the embodiment, the authentication unit may determine a plurality of authentication results by a plurality of authentication methods, the plurality of authentication methods including a first authentication method that uses a first kind of user's input into the device and a second authentication method that uses a second, different from the first, kind of user's input into the device and has lower authentication accuracy than the first authentication method. Further, the first controller, based on an authentication result by the second authentication method, may correct a value indicating a likelihood of being the person, the value being determined based on an authentication result by the first authentication method and being stored in the memory.

In this configuration, a value indicating a likelihood of being the person used for "considered authentication" can be kept more appropriately by having a method with a higher authentication accuracy (e.g., fingerprint authentication and iris authentication) as a main authentication method, having a method with a lower authentication accuracy (e.g. speaker authentication using a voice, face authentication using an image, and authentication based on one's way of keystroke) as a sub authentication method, and combining these authentication results obtained at various timing.

In the above-mentioned apparatus for preventing unauthorized use, the first controller may make the authentication unit determine an authentication result by the first authentication method if the user's first kind of input is made when a first condition is satisfied, and may make the authentication unit determine an authentication result by the second authentication method if the user's second kind of input is made when a second condition is satisfied. The first and second conditions may be determined such that the first authentication method is used less frequently than the second authentication method.

In this way, if the main method with a high authentication accuracy uses more processing power or battery of the device than the sub method, authentication by the main method can be made to perform less frequently than the sub method, and a value indicating a likelihood of being the person which is determined approximately by the main method can be corrected closely based on an authentication result by the sub method which is performed frequently. Thus, a load of authentication on the device can be reduced, and a value indicating a likelihood of being the person can be held more appropriately.

The apparatus for preventing unauthorized use related to the embodiment may further comprise a notification unit that notifies a user about a value indicating a likelihood of being the person and stored in the memory.

In this configuration, a user can get to know, for example, a current level of a value indicating a likelihood of being the person. Thus, when the value is lower than a desired level, a user can set the value high in advance, before the occurrence of a process requiring authentication, by deliberately performing an operation on the device to make an input to be used for "back authentication." In this way, for example, if the process requiring authentication is for using a service provided, via communication between the device and a service terminal, a user can use the service without making an input for authentication in front of the service terminal. Thus, while preventing unauthorized use by others, a waiting line in front of the service terminal can be shortened as well.

In the above-mentioned apparatus for preventing unauthorized use, the notification unit may include a unit that encourages a user to do an input with which the authentication unit can authenticate when a value indicating a likelihood of being the person and stored in the memory is lower than a desired threshold.

In this way, the usability of a device improves, since a user's attention can be attracted regarding the fact that a value indicating a likelihood of being the person is lower than a desired level and a user can also be encouraged to make an input to increase the value. Furthermore, not just being encouraged to make an input, a user may also be informed of what kind of operation would result in making an input to be used for "back authentication."

In the above-mentioned apparatus for preventing unauthorized use, the second controller may compare a value indicating a likelihood of being the person and stored in the memory with, as the certain threshold, a threshold for a service to be conducted by the process instructed to begin, out of thresholds set for every service that the device provides. The notification unit may notify a user allowing the user to distinguish a level of a value indicating a likelihood of being the person and stored in the memory, the level determining a process for which service is permitted to execute.

By receiving the notice, if a user knows a level of a likelihood of being the person required for a service that the user is going to use, the user can recognize, in advance, whether or not the user can use the service (start the corresponding application) with the current value indicating a likelihood of being the person and without making an input for authentication. Thus, the user can increase the value indicating a likelihood of being the person to the required level in advance. Incidentally, a level of a likelihood of being the person required for a service that a user is going to use can be notified to the user, for example, by showing the level on the service terminal to be communicated with the device.

A method for preventing unauthorized use related to the embodiment is a method for preventing unauthorized use in a device comprising an authentication module that compares a characteristic included in a user's input into the device with a registered characteristic of a person to determine as an authentication result a likelihood of the user's being the person. And the method comprises: determining an authentication result by the authentication module from a user's input other than input done in response to an input request for authentication; storing in a memory a value that is determined based on the authentication result and indicates a likelihood of being the person; decreasing, as time passes, a value indicating a likelihood of being the person and stored in the memory; referring to a value indicating a likelihood of being the person and stored in the memory in response to an instruction to begin a process which requires authentication; and controlling whether or not to permit execution of the process instructed to begin depending on whether or not the referred value is a certain threshold or more.

All the matters described above regarding the apparatus for preventing unauthorized use related to the embodiment is applicable to the method for preventing unauthorized use related to the embodiment. For example, the above-mentioned "back authentication" and "continuous authentication" can be realized, in the method for preventing unauthorized use related to the embodiment. This is accomplished by determining a new authentication result by the authentication module using an input which is done by a user during the passage of time and is to be used by the device for a purpose other than authentication or an input accompanying a user's action for a purpose other than authentication and by increasing, maintaining, or decreasing a value indicating a likelihood of being the person and stored in the memory in accordance with the new authentication result. The above-mentioned "considered authentication" can also be realized, in the method for preventing unauthorized use related to the embodiment, by permitting execution of the process instructed to begin without requesting a user to input for authentication if a value indicating a likelihood of being the person and stored in the memory has not decreased to a level below the certain threshold.

The above-described embodiment can be realized as a program for preventing unauthorized use which is to be stored in a memory of a device comprising an authentication module that compares a characteristic included in a user's input into the device with a registered characteristic of a person to determine as an authentication result a likelihood of the user's being the person. This embodiment can also be realized as a storage medium that stores such program.

A device with a function of preventing unauthorized use related to the embodiment comprises: an input unit that accepts a user's input; a process unit that executes an instructed process; an authentication unit that compares a characteristic included in an input accepted by the input unit with a registered characteristic of a person to determine, as an authentication result, a likelihood of the user's being the person; a memory for storing a value that is determined based on an authentication result by the authentication unit and indicates a likelihood of being the person; a first controller that controls a value indicating a likelihood of being the person which is to be stored in the memory, based on an authentication result determined by the authentication unit from a user's input including an input other than the input done in response to an input request for authentication, and based on a passage of time; and a second controller that, in response to an instruction to begin a process which requires authentication, refers to a value indicating a likelihood of being the person and stored in the memory and permits or refuses the process unit's executing the process instructed to begin depending on whether or not the referred value is a certain threshold or more.

In the above-mentioned device, with a function of preventing unauthorized use, it is desirable that a program for realizing the authentication unit and the first and second controller and certain data including the registered characteristic of the person are securely stored in the device (e.g., concealed in an IC chip comprising a processor and a memory), and a value indicating a likelihood of being the person and stored in the memory can not be changed by other than the first controller.

In the above-described embodiment, an example of an input that can be used for authentication by the authentication unit/authentication module may be at least one of the following: a fingerprint of a user's finger that touched a button of the device; a sound emitted by a user to a microphone of the device; an image of a user's body part captured by a camera of the device; data inputted into a sensor provided at a part that a user touches to hold the device in the user's hand; a user's keystroke to keys of the device; and information obtained by the device through its communication with an external device in response to a user's action.

As described above, according to the embodiment, the device holds a value indicating a likelihood of being the person at all times, performs "considered authentication" in the case of a process requiring authentication, and updates the value with a passage of time and by "back authentication." Thus, appropriate protection (locking) against unauthorized use by others can be compatible with a reduction of troubles and time for unlocking.

The embodiment will be described below with reference to drawings. Here, it will be described taking a portable device as an example, but the apparatus for preventing unauthorized use related to the embodiment is also applicable to non-portable devices such as a personal computer.

FIG. 1 shows an inner configuration example of a portable device related to the embodiment. An input section 110 has a function to take in user's input as well as individual data from a user's spontaneous operation via a fingerprint sensor, a microphone, a camera, a keypad or the like. A control section 120 is composed of a CPU, RAM, ROM, or the like, and executes a program based on an input from the input section 110, and shows a result on a display section 130 or stores in a memory. When execution of a process requiring authentication is requested, the control section 120 gives a command to start an application, to access data, or the like, to the later-described authentication control section 160 prior to execution of the process. The display section 130 is composed of an LED, a screen, an exclusive indicator lamp, or the like, and shows a result of a process executed by the control section 120. The display section 130 also has a function to notify a user of a value indicating a likelihood of being the person (also referred to as a recognition value) which is managed by the later-described authentication control section 160, wherein it classifies the value in various levels, determines a color for each level, and lights up the LED in a color corresponding to the level of likelihood of being the person at the point of time.

The portable device comprises an apparatus for preventing unauthorized use 100 including an authentication section 140, a comparison data memory 150, and an authentication control section 160. The apparatus for preventing unauthorized use is included in the portable device, for example, as an IC chip. It is tamper resistant and can maintain confidentiality of a program or important data concealed in the apparatus for preventing unauthorized use. The portable device can also be comprising of a similar apparatus for preventing unauthorized use as an IC card and attaching it to a portable device. The IC card, in this case, may be used an IC card mounted with a function to use a service related to, for example, e-commerce by doing, preferably, contactless communication with a service terminal located at a cash register of a store, a ticket gate at a station, a gate at a venue, or the like.

The authentication section 140 authenticates a user, based on individual data taken in by the input section 110 by way of a user's spontaneous operation and on comparison data. Authentication by the authentication section 140 is performed every time individual data is taken in or at timing set by the authentication control section 160. The comparison data memory 150 holds data required to check a user for every authentication method (e.g., fingerprint and voice data). The comparison data is securely saved in a tamper resistant area in the portable device or the IC card. It may be updated if required.

The authentication control section 160 sets a likelihood of a user's being the person (recognition value) based on an authentication result in the authentication section 140 and on a passage of time, and continuously manages the user's recognition value (this is referred to as a "continuous authentication means"). The continuous authentication means also manages timing of authentication (back authentication) performed by the authentication section 140. The continuous authentication means may change a likelihood of a user's being the person (recognition value) based on a passage of time or it may control the value without changing it. In the case of decreasing the set recognition value with a passage of time, a likelihood of a user's being the person (recognition value) is set, for example, as follows:

$Rec\_t = (Rec\_t' * W\_all + Rec\_x1 * W\_x1) / (W\_all + W\_x1)$ $Rec\_t'$: A likelihood of the user's being the person immediately before $Rec\_x1$: A likelihood of the user's being the person obtained by an authentication method x1

$W\_all$: Weight assigned to a likelihood of the user's being the person immediately before $W\_x1$: Weight assigned to the authentication method x1

Here, $W\_all$ and $W\_x$ may be fixed values, or variable values corresponding to values of $Rec\_t'$ and $Rec\_x$.

When likelihoods of being the person are obtained by a plurality of authentication methods at the same time, a likelihood of the user's being the person is set, for example, as follows:

$Rec\_t = (Rec\_t' * W\_all + Rec\_x1 * W\_x1 + \ldots Rec\_xn * W\_xn) / (W\_all + W\_x1 + \ldots + W\_xn)$ $Rec\_xn$: A likelihood of the user's being the person obtained by No. n authentication method xn $W\_x1$: Weight assigned to the authentication method xn When the authentication control section 160 receives, from the control section 120, a command to start an application requiring authentication or a command to access data, it refers to a likelihood of being the person (recognition value) at that time, and if the value is a threshold or more, it considers that the user is authenticated and executes the command (this is referred to as the "considered authentication means"). The considered authentication means and the continuous authentication means are realized, for example, by having a processor in an IC chip execute a program securely stored in a memory of the IC chip. Data of a likelihood of being the person (recognition value) is securely managed in the IC chip such that it is not outputted outside the IC chip nor cannot be rewritten from outside the IC chip except, for example, that the display section 130 is lit up according to the level of the recognition value.

Various authentication methods may be performed by the authentication section 140 as follows. First, there is fingerprint authentication. In this case, a fingerprint authentication device is mounted on a part of a portable device where a user touches with fingers in the flow of spontaneous operations. For example, when a user touches a specific button (corresponding to the input section 110) mounted with a fingerprint authentication device (a device that takes in fingerprint data), a process designated by the pushing of the button is executed, and the authentication section 140 simultaneously performs an authentication process as the fingerprint data is taken in by the fingerprint authentication device.

The authentication process by the authentication section 140 may be performed every time the specific button is pushed or when the specific button is pushed while a certain condition is satisfied. The certain condition may be, for example, that a certain time period has passed after the previous authentication process (the time period is measured using a timer), or when a managed likelihood of being the person (recognition value) is below a certain threshold. When the specific button is pushed while the certain condition is not satisfied, the authentication process is not performed and only the process designated by the pushing of the button is performed. A user may operate knowing which button is mounted with the fingerprint authentication device, or may push the button without knowing it.

Buttons suitable for being mounted with the above-mentioned fingerprint authentication device, in the case of a cell phone, are a one-push open button, an enter button, a long-push button, or the like. The one-push open button is used only when opening a flip-type cell phone, but it is highly likely that fingerprint data with relatively good accuracy can be obtained. The enter button is used frequently when a cell phone is used while it is opened, so authentication (back authentication) can be performed frequently. The long-push button is, for example, a button for reading emails, a button for turning on/off manner mode, or a shortcut button for i-appli. Because the button is pushed for a long time, it is expected that accurate fingerprint data can be obtained even without a user's being aware of it.

The fingerprint authentication device can also be mounted on something other than a button, such as beneath the keypad or the back of the flip. In the case of a cell phone, a user often uses it by supporting the back of the flip with an index finger, so it is desirable to provide the fingerprint authentication device on that supported part. In fingerprint authentication, if a user usually uses a cell phone by supporting the back of the flip with a middle finger, a fingerprint of the middle finger is registered as comparison data, since fingerprints of, for example, index and middle fingers are different from each other. So the user will not be authenticated unless the user touches with the middle finger.

Secondly, there is voice authentication. In the case of a telephone, a voice during a call can be used for authentication. And in the case of a portable device that can execute a process by a voice command, a voice during the voice command input can be used for authentication. Incidentally, voice authentication is less accurate than fingerprint authentication, especially when a portable device is used in a noisy environment. So, as described later, it is desirable to adopt it in a manner that a likelihood of being the person (recognition value) is determined by fingerprint authentication as a main method and then is corrected by voice authentication as a sub method.

In the case of using voice during a call for authentication, speaker authentication is performed as voice is outputted to a telephone line. There can be two methods of speaker authentication: a method to perform text-dependent authentication using a voice at the beginning of a call (e.g., "hello," "yes," and "yes, XX speaking"); and a method to perform text-independent authentication using a voice during a call (at any period). In text-dependent authentication, if a user always starts a call with "hello," speaker authentication is performed using comparison data of a voice saying "hello." So if another person unknowingly starts a call with "yes," the other person will be distinguished with high possibility. In the case of using a voice command for authentication, when a voice command is made, speaker authentication is performed as the command is recognized.

When a portable device is mounted with a camera, authentication can also be made using image. For example, a camera is started up when a user starts some operation (e.g., reading emails), and if there is a face image in a shooting area (if the camera is located on the side of an email display of a cell phone, it is highly likely that a face of the user looking at the display would be in the camera's shooting area), the face will be authenticated. Face authentication may also be performed by extracting a face image from a photograph taken by a user with a self-photographing camera. If camera resolution improves, it can be considered that an image of the iris is taken at the similar timing as above so as to perform iris authentication, which is more accurate than face authentication.

Other biometrics authentication technologies, such as vein authentication or palm print authentication, can be used as well. In vein authentication, a vein pattern is read by a sensor under infrared light so as to authenticate. For example, a vein sensor is mounted on the back of a cell phone so that data is taken to be authenticated when a user holds the phone. Also in palm print authentication, a palm print sensor may be mounted on the back of a cell phone so that data is taken to be authenticated when a user holds the phone.

Authentication can also be performed using a keystroke (e.g., style of email, and a way of inputting symbols). A portable device executes a process instructed by a user's key entry and simultaneously performs a process to judge that the user is not the person if the key stroke is unusual. A record of user's action can be used for authentication as well. For example, an ID of a transaction service terminal where a transaction process was executed using a portable device, an ID of a ticket gate service terminal where a ticket gate process was executed, or the like is taken into the portable device. Thus, based on this information, a user's location can be identified, and data of the date and time on which each process was executed is also taken into the portable device. Therefore, when a user has the portable device communicate with a service terminal, a process of a service provided by the service terminal is executed, and a process, which combines this data on location, date, and time so as to judge that the user is not the person if the pattern of the user's action is unusual, is simultaneously executed. Back authentication of the embodiment can be performed with whichever authentication methods described above.

Figure 2:
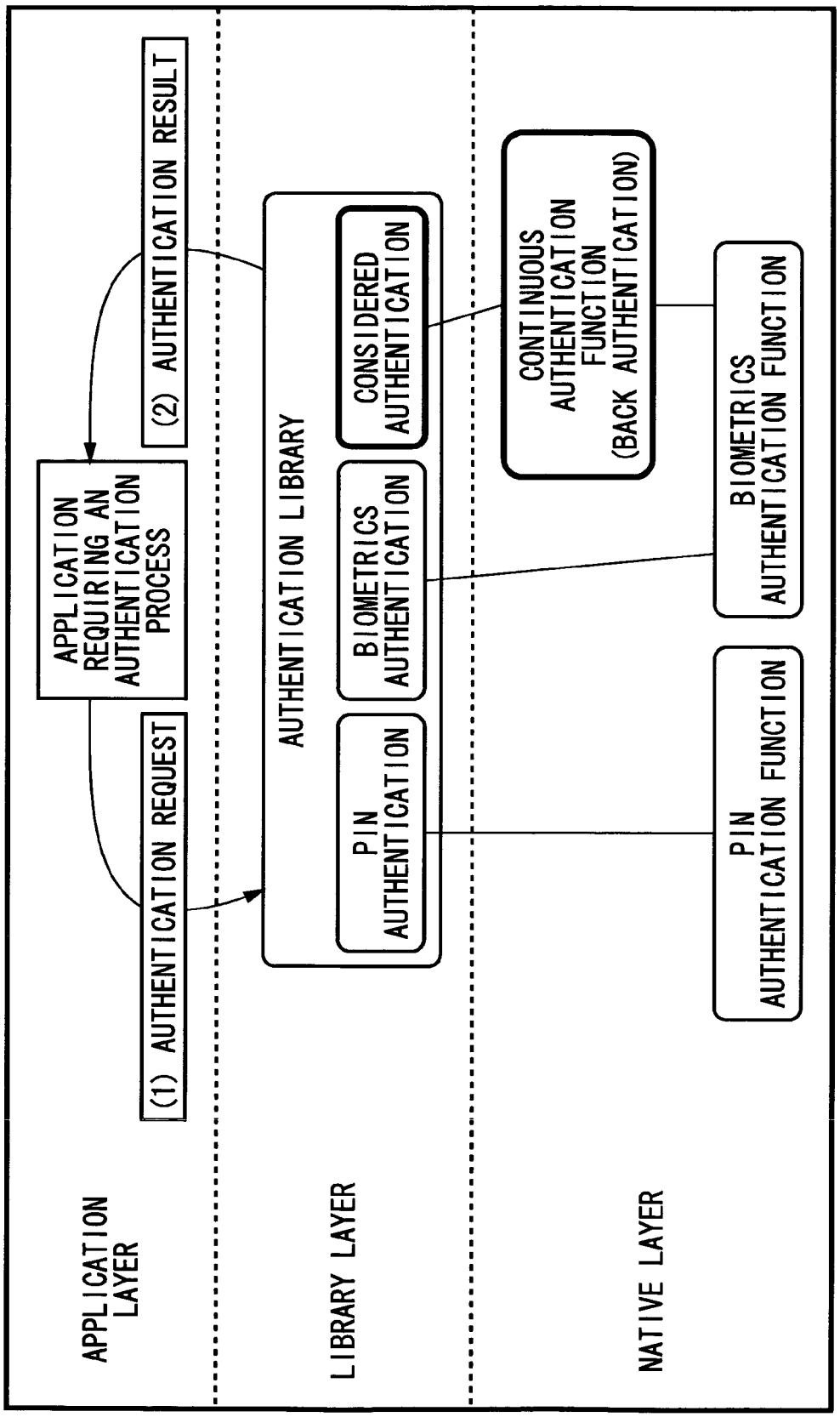
FIG. 2 illustrates implementation of a continuous authentication and considered authentication related to the embodiment.

FIG. 2 illustrates how the above-described continuous authentication and considered authentication are implemented. An application requiring authentication merely requests an authentication library to authenticate and inputs the authentication result which comes back in response. Thus, when considered authentication related to the embodiment is performed, the application does not need to be modified as in the case of existing PIN authentication (a kind of password authentication) and biometrics authentication. Incidentally, a section to pass a result between the application and the library requires protection, such as a signature or a code, against tampering.

Existing PIN authentication and biometrics authentication, which belong to a library layer, authenticate using a PIN authentication function and a biometrics authentication function in a native layer, respectively. These authentication methods authenticate using respective authentication functions after receiving an authentication request (1) in the figure from the application. Thus, the process would be time-consuming and troublesome. On the other hand, considered authentication of the embodiment, also belonging to the library layer, only refers to a likelihood of being the person (recognition value) at that time, which is previously set by the continuous authentication function in the native layer, upon receiving an authentication request (1) in the figure from the application. Thus, the process is less time-consuming and less troublesome. The continuous authentication function of the embodiment belonging to the native layer manages a likelihood of being the person (recognition value) using the biometrics authentication function of above-described various authentication methods as back authentication.

Each authentication function in the native layer is securely executed separately in a tamper-resistant area (e.g., an IC chip or IC card). When the library layer has at least one of PIN authentication, biometrics authentication and considered authentication, a user may set in advance which method to use or it may be designated by the application in an authentication request (1). In the case that the application designates, a service provider which provides the application can set which authentication library to be used. Incidentally, a portable device may of course be configured to only have considered authentication in the library layer.

Figure 3A:
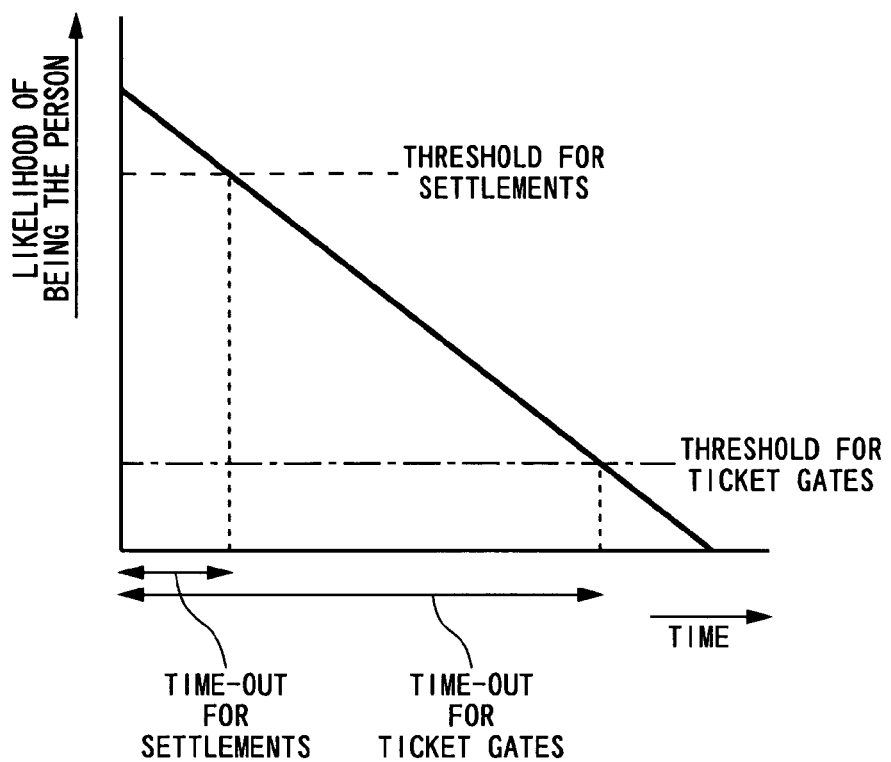
FIGS. 3A and 3B show how a likelihood of being the person (a degree of recognition) decreases as time passes.
Figure 3B:
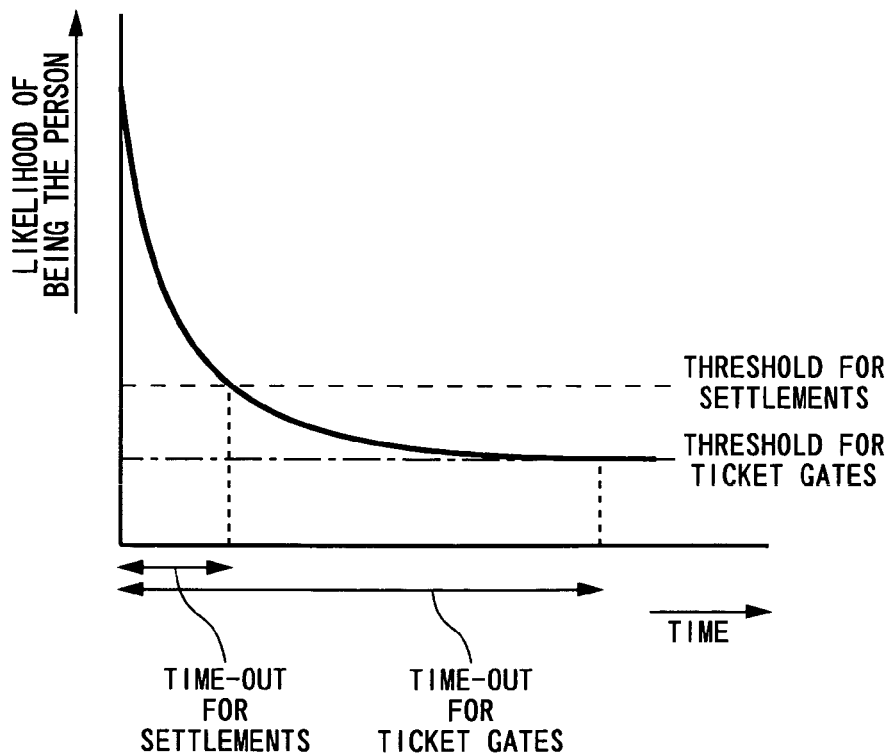

The continuous authentication function of the embodiment sets a new likelihood of being the person (recognition value) when authentication succeeds, but decreases the value as time passes if no further authentication result is obtained (i.e., if an operation to be used for authentication is not performed by a user, or if a condition to perform authentication is not satisfied). This state is shown in FIGS. 3A and 3B. FIG. 3A is an example that a recognition value decreases monotonously as time passes, and FIG. 3B is an example that a recognition value decreases based on an optional function.

A timer that holds a passage of time for which a likelihood of being the person is decreased may be started when authentication is once finished or when a series of operations used for authentication is finished. In the latter case, for example, when authentication is performed using a voice during a call, the timer for decreasing the value may be started when the call is finished instead of when authentication is finished, considering that there is no possibility that the user becomes another person as long as the call continues. Similarly, when authentication is performed using a fingerprint of a finger that supports a cell phone on the back of the flip, the timer for decreasing the value may be started when it is detected that the finger is lifted from there, considering that there is no possibility that the user becomes another person as long as the finger is touching there. A relationship (function) between a recognition value and time when decreasing the value is incorporated in advance in the continuous authentication function, as shown in FIG. 3A or 3B. Various functions can be prepared so that a way of decreasing the recognition value after authentication is changed depending on which method is used for authentication (e.g., fingerprint authentication or voice authentication).

Considered authentication of the embodiment permits execution of a process requiring authentication if a likelihood of being the person (recognition value) managed by the continuous authentication function is a threshold or more, and the threshold can be changed depending on details of the process. For example, a threshold corresponding to a process requiring a high level of safety such as transactions is set high. Further, a threshold corresponding to a process which may have a relatively low level of safety such as a ticket gate process (conventional IC cards used for a ticket gate process are password-free) is set low. This threshold setting may be made by a service provider incorporating a threshold into a provided program (the threshold can be rewritten by a service terminal when a user uses a portable device to receive a service process from the service terminal) or by a user as the user likes. However, for services requiring safety, it is desirable that a user is only allowed to set a threshold within the scope of a threshold designated by a service provider or more. On the other hand, a level of safety required for privacy-related data (e.g., incoming and outgoing emails, and a record of incoming and outgoing calls) may vary significantly with the user, so it is desirable that each user is allowed to freely set a threshold which permits a process to access such data.

Based on a relationship between these thresholds and a function decreasing a likelihood of being the person, a time that a user can no longer use the service or data (time-out) is determined as shown in FIGS. 3A and 3B. In other words, a process requiring a high level of safety such as transactions will become non-executable shortly unless, a likelihood of being the person is confirmed. In addition, a process that may have a low level of safety such as a ticket gate process is maintained in a state where it can be executed for a while even if a likelihood of being the person cannot be confirmed.

Figure 4:
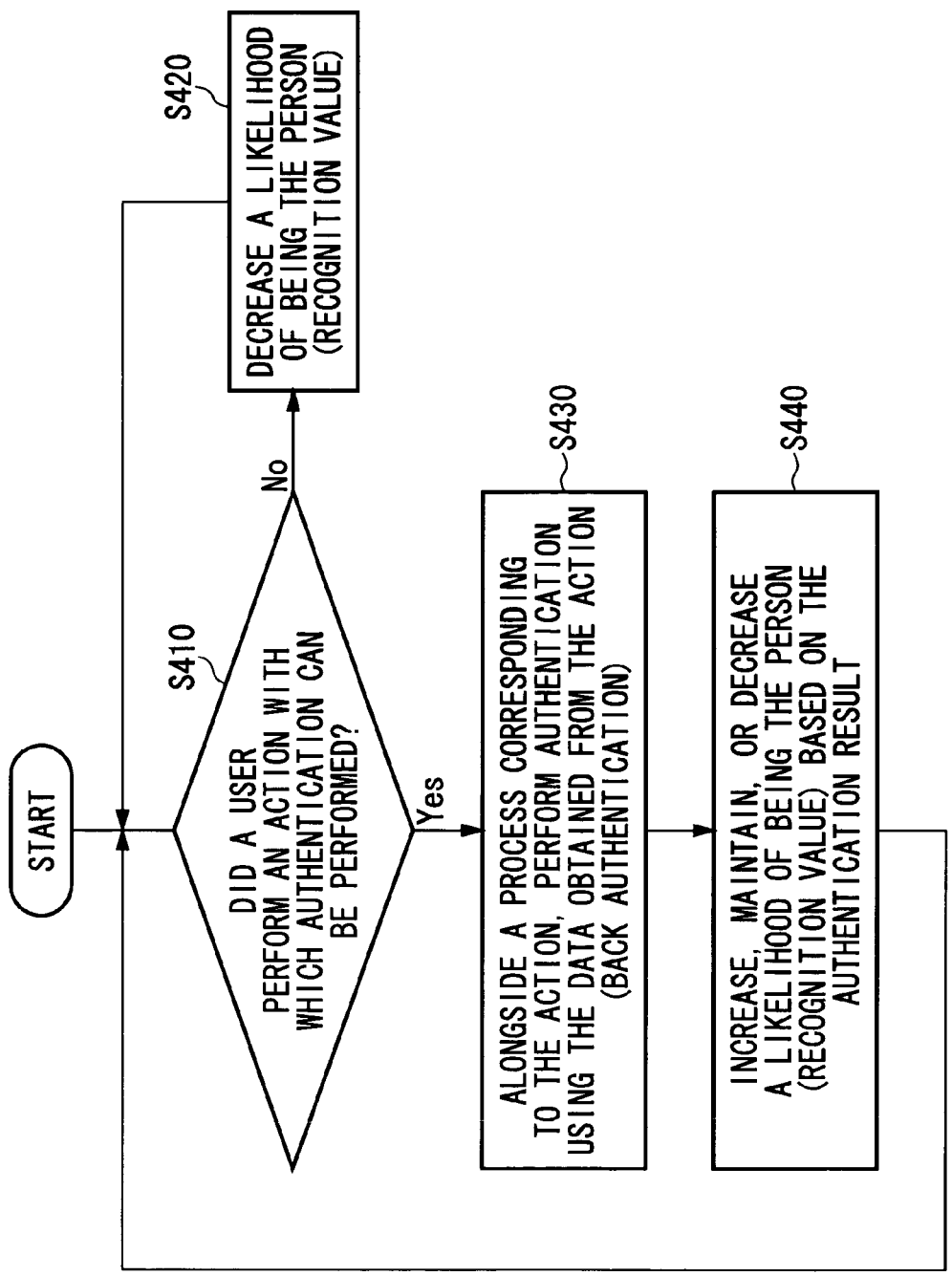
FIG. 4 shows an operation example of an authentication control section 160 (continuous authentication function) for setting a likelihood of being the person (a recognition value), in a case where a single authentication method is used.

Shown above are cases where a likelihood of being the person (recognition value) decreases gradually as time passes. But in the following cases, the value is decreased substantially even if time has not passed. For example, there is a case that back authentication is performed but failed, a case where a user explicitly instructs to decrease the value when the user takes the portable device out of the control of the user, or the like. Moreover, an acceleration sensor may be mounted on a portable device so that when the sensor detects that the device is motionless for a certain period, the device is considered to be left somewhere and the recognition value is decreased sharply. FIG. 4 shows an operation example of the authentication control section 160 (continuous authentication function) which sets a likelihood of being the person (recognition value) using one of the various authentication methods described above. The authentication control section 160 monitors at all times whether or not a user performed an action with which back authentication can be performed (e.g., pushing of the button provided with a fingerprint reading function, starting a phone call, and starting to read emails), (S410). If there has not been, for a prescribed period, any action with which back authentication can be performed, a recognition value is decreased (S420). In this example, the recognition value will decrease stepwise (the width of the step corresponds to the prescribed period), instead of decreasing gradually as shown in FIG. 3A. On the other hand, if there is an action with which back authentication can be performed, the user's individual data (e.g., fingerprint data, voice data from a microphone, or an image taken by a camera which is started up when reading emails), alongside a process corresponding to the action, is taken into and sent to the authentication section 140 (as a back process) to be authenticated based on the sent individual data and comparison data (S430).

When authentication succeeds (when an authentication result is a prescribed threshold or more), a recognition value is set equal to or over a threshold at which the user is considered as valid (the person). The value may be set as a fixed value, or a value according to a recognition result (likelihood or the like). On the other hand, when authentication fails (when an authentication result is less than the prescribed threshold), a recognition value is set less than the threshold at which the user is considered as valid (the person). As another setting manner, a recognition value may be set according to an authentication result (likelihood or the like) without distinguishing between success of authentication and failure (S440).

The flow chart of FIG. 4 showed an example where back authentication and a recognition value setting are performed every time a user performs an action with which back authentication can be performed. However, for a certain period (e.g., the same period as the prescribed period after which a recognition value is decreased at S420), even when a user performs an action with which back authentication can be performed, only a process corresponding to the action may be executed without performing back authentication and a recognition value setting.

Figure 5:
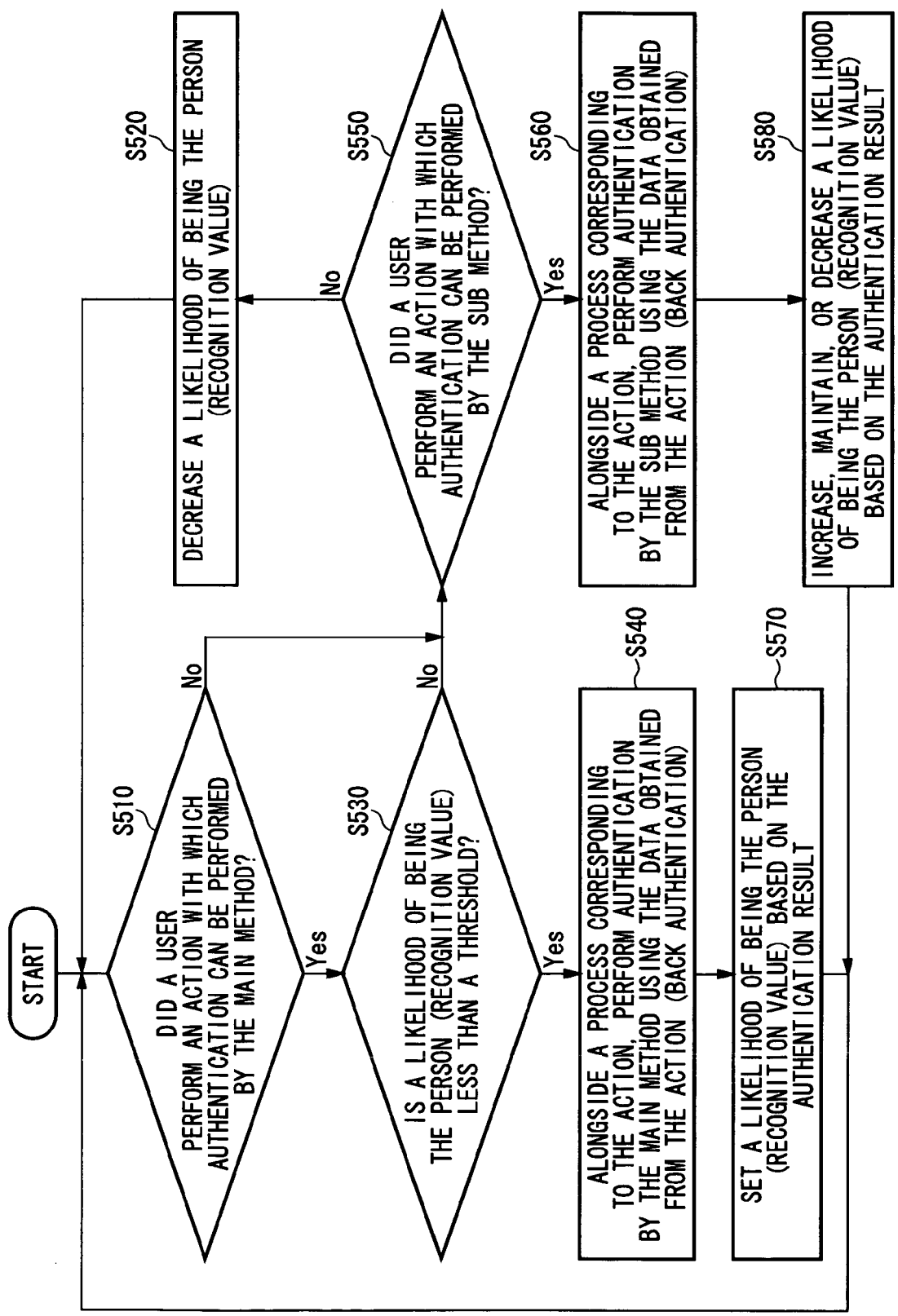
FIG. 5 shows an operation example of an authentication control section 160 (continuous authentication function) for setting a likelihood of being the person (a recognition value), in a case where a plurality of authentication methods are used.
Figure 6:
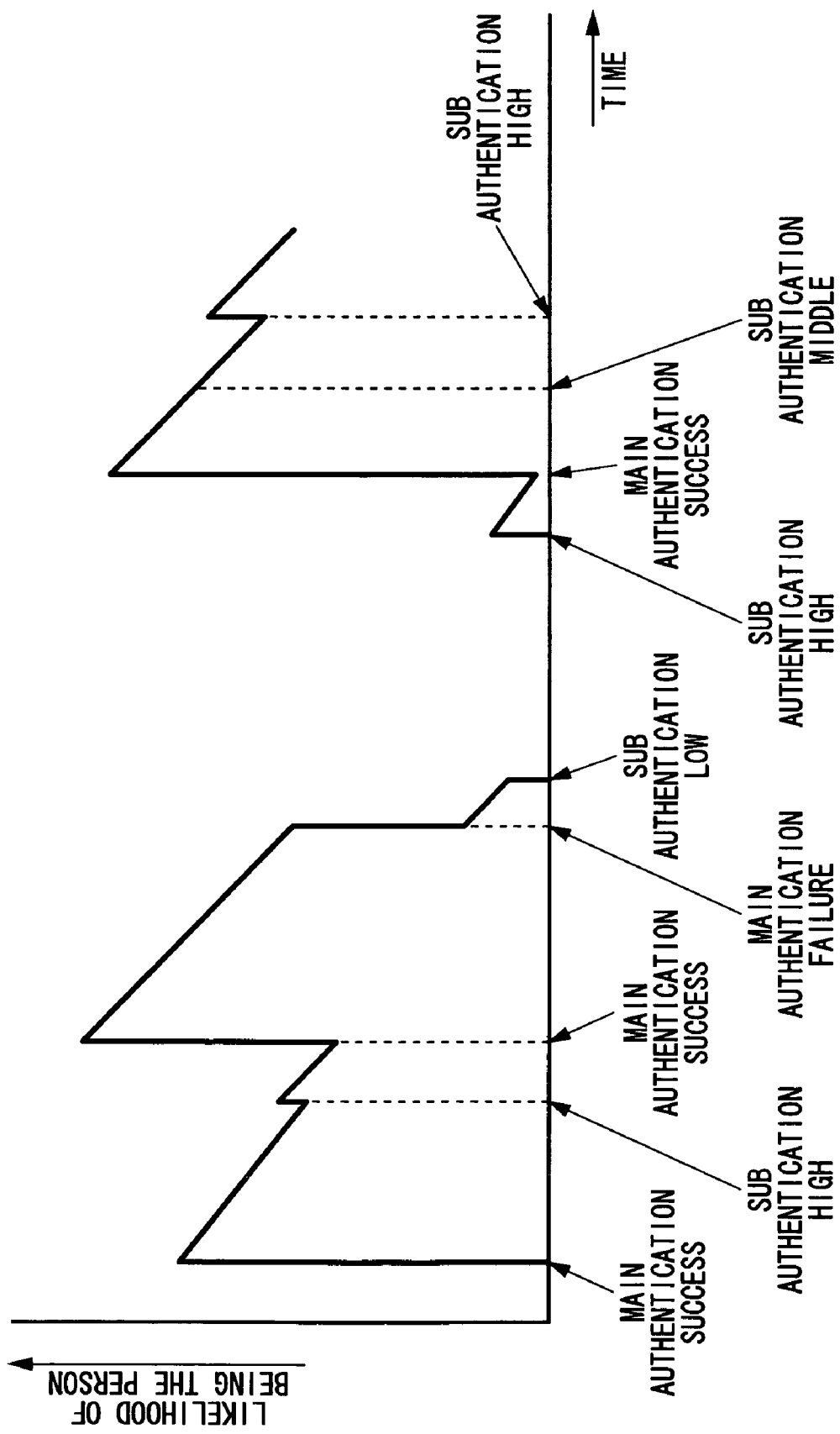
FIG. 6 shows an example of a change in a likelihood of being the person (a recognition value) in a case where a plurality of authentication methods are used.

FIG. 5 shows an operation example of the authentication control section 160 (continuous authentication function) for setting a likelihood of being the person (recognition value) by combining a plurality of authentication methods of various kinds of authentication methods described above. Described here, as a combination of a plurality of authentication methods, is an example where an authentication result of a main method is adjusted based on an authentication result of a sub method. Generally, as in the case of a single authentication method described above, a recognition value set based on an authentication result of a main method is decreased as time passes. Meanwhile, if a sub authentication method judges that a user is the person (authentication success), the value will be stopped from decreasing for a prescribed period or increased conversely. If the sub authentication method judges that a user is another person (authentication failure), the value will be decreased more than a decrease due to a passage of time. Instead of adjusting the value based on authentication success or failure by the sub method, it may be adjusted based on an authentication result of the sub method (likelihood or the like). For example, if the sub method determines that a user is the person with: 90% certainty or more, a recognition value is increased (an amount of the increase may be a fixed value or a value according to a recognition result (likelihood or the like)); 80-90% certainty, the value is maintained for a prescribed period; 60-80% certainty, the value is decreased by a function of time; and less than 60% certainty, the value is decreased more than a decrease due to a passage of time (an amount of the decrease may be a fixed value or a value according to a recognition result (likelihood or the like)). A recognition value which is set by back authentication at all times in this manner and decreases as time passes changes, for example, as shown in FIG. 6.

In the flow chart of FIG. 5, when a user performs an action with which back authentication can be performed by a main method (e.g., pushing of a button provided with a fingerprint reading function) (S510 Yes), the authentication control section 160, alongside a process corresponding to the action, takes in the user's fingerprint data and sends it to the authentication section 140 (as a back process) to be authenticated based on the sent fingerprint data and comparison data (S540). Then, as in the case of a single authentication method shown in FIG. 4, a recognition value is set based on an authentication result (S570). If there has not been any action with which back authentication can be performed by a main nor sub authentication method after a prescribed period (S510 No, S550 No), the recognition value is decreased (S520).

If there is an action with which authentication can be performed by a sub authentication method (e.g., starting a phone call, and starting a voice command) (S550 Yes), the user's voice data, alongside a process corresponding to the action, is taken in and sent to the authentication section 140 (as a back process) to be authenticated based on the sent voice data and comparison data (S560). Then, a recognition value is increased (or is stopped decreasing) if the sub authentication succeeds, and the value is decreased if it fails. As another setting manner, increase or decrease of a recognition value may be determined according to an authentication result (likelihood or the like) of the sub method without distinguishing between success of sub authentication and failure (S580).

In the operation example of FIG. 5, back authentication is performed every time a user performs an action with which authentication can be performed by a sub method. On the other hand, when a user performs an action with which authentication can be performed by a main method, back authentication is performed by the main method (S540) not always but when a recognition value is less than a certain threshold (S530 Yes). In this way, authentication by the main method is made to perform less frequently than authentication by the sub method. In the case of using a single authentication method as FIG. 4, if back authentication is performed less frequently, it becomes likely that considered authentication will fail even though a user is the person, or even when a user is another person, an opportunity to distinguish the fact and decrease a recognition value sharply will be missed. On the contrary, in the case of using a plurality of authentication methods as FIG. 5, even if back authentication by a main method is performed less frequently, a sub method is performed frequently meanwhile to maintain a likelihood of being the person close to the real value. Thus, an accuracy of distinguishing between the person and another person is not sacrificed so much. For example, as long as the person continues to use, even if time passes, a recognition value will increase due to sub method authentication, so that a condition where the value is beyond a certain threshold can be kept. Further, if another person starts to use, a recognition value decreases more sharply than a decrease due to a passage of time because of sub method authentication, so that a condition where the value is less than a certain threshold can be achieved quickly.

To make main method authentication less frequent, other than performing it solely when a recognition value becomes less than a certain threshold, it may be performed solely after a certain period (longer than a certain period in FIG. 4) has passed. If a recognition value is a certain threshold or more (S530 No), back authentication and a recognition value setting are not performed, but only a process corresponding to an action is executed. If a user's action can be predicted, for example, if a user is expected to soon use a service terminal (ticket gate or the like) requiring a recognition value which is a certain threshold or more, a recognition value required to use the service terminal can be reserved even after some time has passed, by temporarily making main method authentication more frequent so as to set a high recognition value by user's actions with which authentication can be performed by the main method. Or, obtaining an authentication result of a sub method (execution of an authentication process) may be performed after a certain time has passed since obtaining an authentication result of a main method so that the authentication result of the main method is corrected with the result of the sub method. Also, out of the authentication results obtained by the sub method, the ones obtained after the certain time has passed since obtaining the authentication result of the main method may be used for correction.

Figure 7:
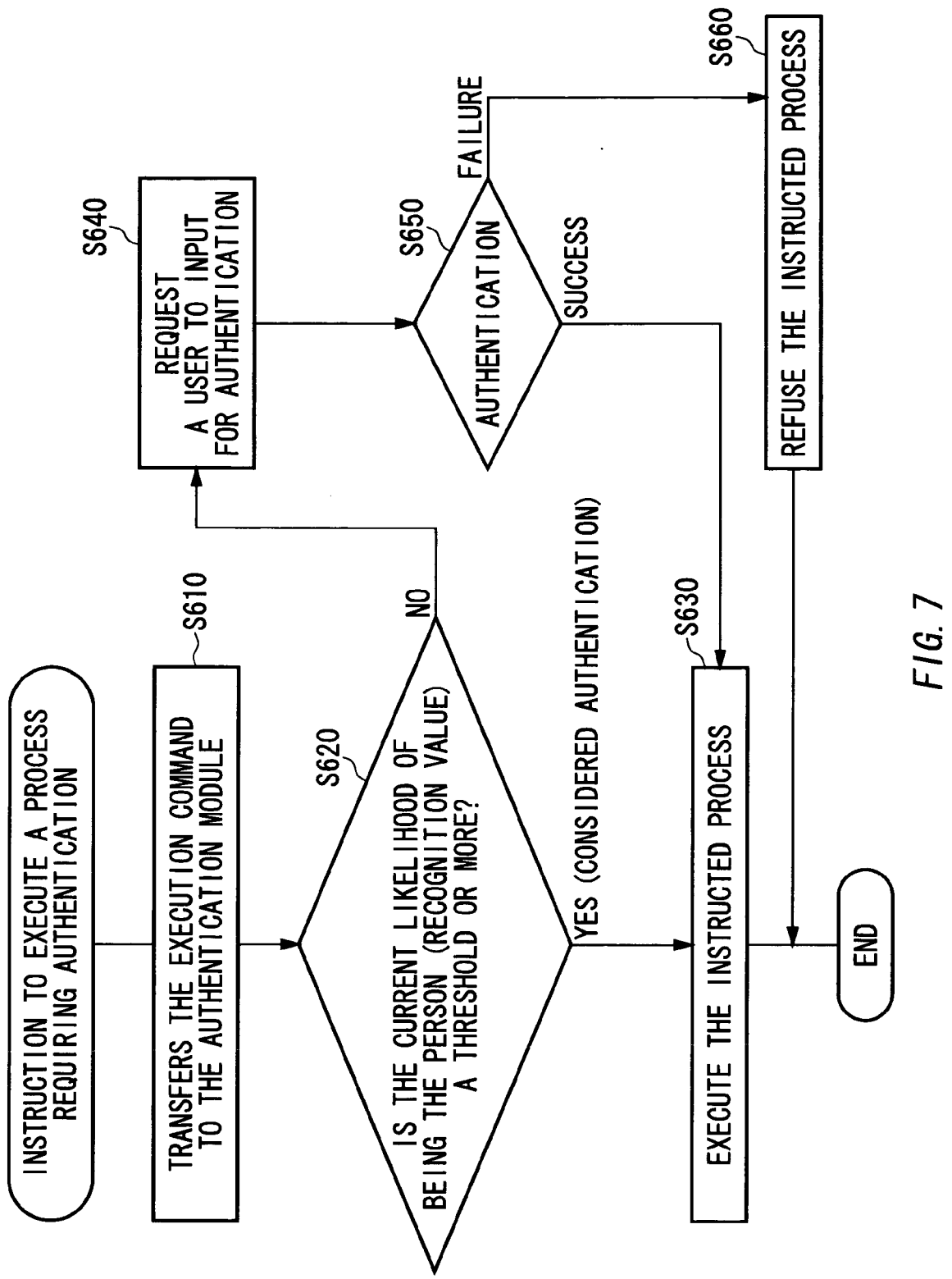
FIG. 7 shows an operation example of an authentication control section 160 (considered authentication) when a process requiring authentication is to be executed.

FIG. 7 is an operation example of the authentication control section 160 (considered authentication) when a process requiring authentication is to be executed. When a user tries to execute a process (starting up an application, accessing data, or the like), the control section 110 sends to the authentication control section 160 a command to execute the process. The authentication control section 160 checks a likelihood of being the person (recognition value) at that time (S620). If the value is a threshold or more, then authentication is considered to be successful and the process is executed (S630). If the recognition value is less than a threshold, then a regular display of authentication (password input, fingerprint input, or the like) shows up (S640), and authentication (S650) is performed based on a user's input which is in accordance with the instruction of the display. If authentication succeeds here, the process is executed (S630). But if it fails, the execution of the process is refused (S660). As described above, a threshold here may have been set depending on a process.

Figure 8:
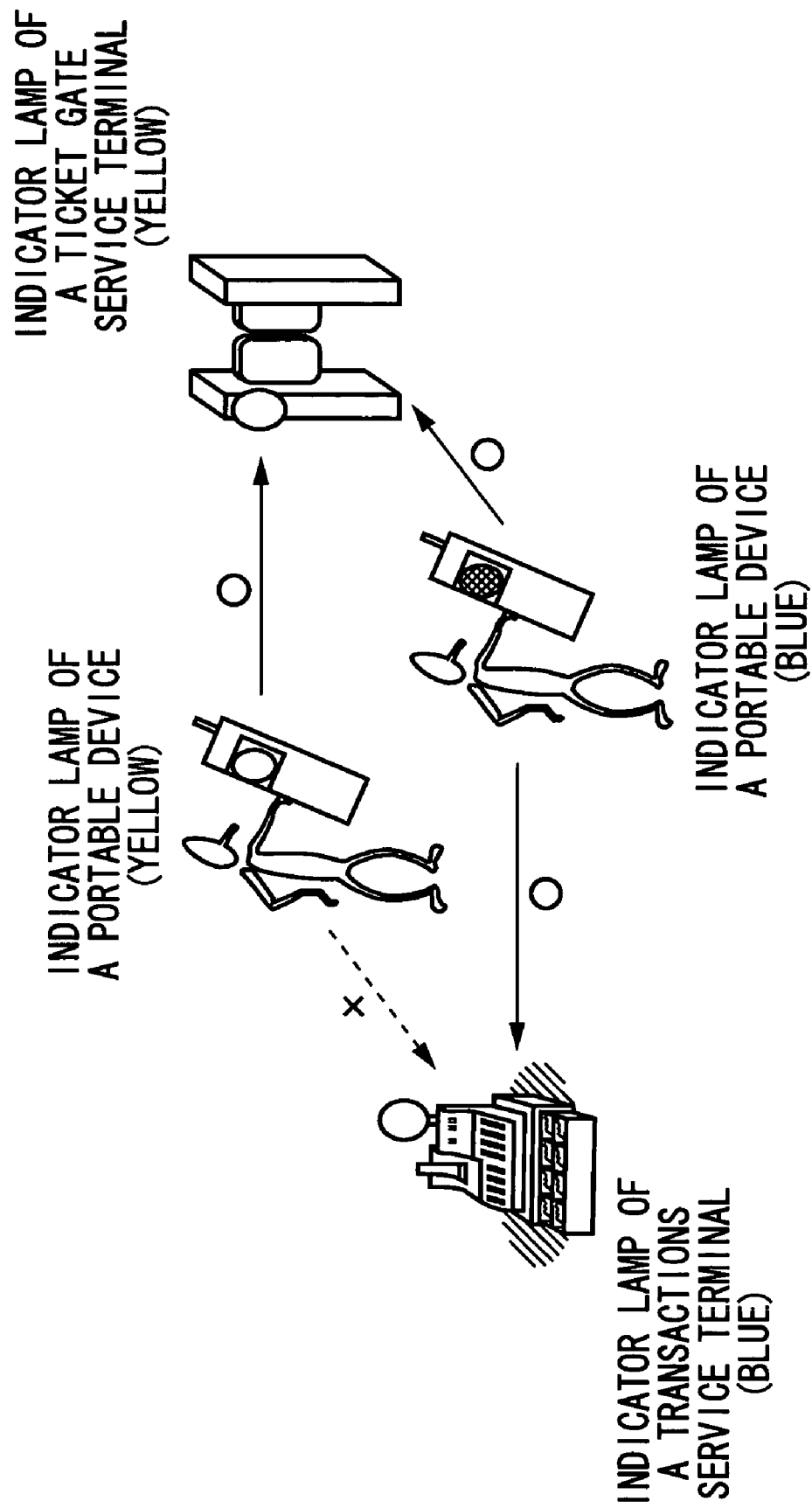
FIG. 8 shows an example of a form of a service that can be realized when a likelihood of being the person (a degree of recognition) is informed to a user.

FIG. 8 shows an example of a form of a service that can be realized when a likelihood of being the person (a degree of recognition) at that time is informed to a user. First, a recognition value is classified into various levels, and a color for each level is determined. For example, when a recognition value is expressed in percentage, and considering that 100% is definitely the person, 0% is definitely another person, and 70% is a threshold, the value is displayed or lit as follows: 95-100% is blue; 95-80% is yellow green; 70-80% is yellow; and less than 70% (less than the threshold) is red. In this way, a user can be clearly notified by displaying a screen or lighting up an LED in a color for a likelihood of being the person at that time. Thus, for example, when an indicator lamp lights up red, a user can finish authentication by deliberately performing an action with which back authentication can be performed, while executing any process. "Deliberately performing" is, for example, carefully pushing an entry button if the button is provided with a fingerprint reading device. Here, an example of displaying a value in color is described, but a current likelihood of being the person may be displayed on a display of a portable device as an indicator (volume of the likelihood is displayed as an indication of radio field intensity or of remaining battery power).

A level of recognition value required for a service may be displayed in color on an indicator lamp (or indicator label or sticker, etc.) of the service terminal (POS, ticket gate, etc.). In the example of FIG. 8, an indicator lamp of a POS terminal for transactions lights up blue because it requires 95% recognition value or more, and an indicator lamp of a gate terminal for a ticket gate lights up yellow because it only requires 70% recognition value or more. In this way, a user of a portable device whose indicator lamp lights up yellow will understand, at a glance, that the user can go through a ticket gate but cannot make a payment at a POS in a current state. Further, a user of a portable device whose indicator lamp lights up blue will understand, at a glance, that the user can do both. In this example, the lowest threshold among thresholds required for various services is used to light an indicator lamp in red.

The above-described embodiment is only an example. The invention is not limited to the above-described embodiment, and many variations and applications can be made so as to be implemented. For example, biometrics authentication is mainly discussed as a method of back authentication. But if recognition by biometrics authentication does not work well, a password input may be asked for and a likelihood of being the person (recognition value) may be set based on the authentication result of the password. In this case, however, it is desirable that the password has sufficient security strength to avoid easy guessing.

As described above, if an apparatus for preventing unauthorized use related to the invention is used, an information processing device can be appropriately protected against unauthorized use by others without complicated processes or the like. Thus, it is useful in protecting important data or privacy-related information in a portable device for using various services, such as electronic transactions, management of entry into a place or a room, or fare adjustment of a means of transportation.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

The invention claimed is:

1. An apparatus for preventing unauthorized use, the apparatus comprising:
   an authentication unit operable to compare a characteristic obtained from a user's input into a device with a registered characteristic of a person, and determine, as an authentication result, a likelihood of the user being the person, the authentication result being determined based on the comparison;
   a memory for storing a value that (i) is determined based on an authentication result determined by the authentication unit, and (ii) indicates the likelihood of the user being the person;
   a first controller operable to update, as a most recent stored value, a previously determined past value stored in the memory and indicating a prior likelihood of the user being the person, the past value being updated based on (i) a present authentication result determined, by the authentication unit, from the user's input including an input other than an input done in response to an input request for authentication, and (ii) the previously determined past value that is stored in the memory and indicates the prior likelihood of the user being the person; and
   a second controller operable to, in response to an instruction to begin a process which requires authentication, (i) refer to the most recent stored value indicating the likelihood of the user being the person, and (ii) control whether or not to permit execution of the process depending on whether or not the value referred to is more than a certain threshold,
   wherein the first controller, based on a certain function, decreases the most recent stored value indicating the likelihood of the user being the person as time passes while an authentication result is not determined by the authentication unit.

2. The apparatus for preventing unauthorized use according to claim 1, wherein the second controller refers to the most recent stored value indicating the likelihood of the user being the person, without requesting the user to input for authentication when instructed to begin the process which requires authentication, and requests the user to input for authentication without permitting execution of the process instructed to begin if the value referred to is lower than the certain threshold.

3. The apparatus for preventing unauthorized use according to claim 1, wherein the first controller controls the authentication unit to determine an authentication result using, as the user's input, (i) an input to be used by the device for a purpose other than authentication, or (ii) an input accompanying a user's action for a purpose other than authentication.

4. The apparatus for preventing unauthorized use according to claim 1, wherein the first controller decreases the most recent stored value indicating the likelihood of the user being the person as time passes while an authentication result is not determined by the authentication unit, and, if an authentication result is determined by the authentication unit, the first controller increases, maintains, or decreases the most recent stored value indicating the likelihood of the user being the person in accordance with the determined authentication result.

5. The apparatus for preventing unauthorized use according to claim 4, wherein the first controller controls the authentication unit to determine an authentication result every time the user's input, with which the authentication unit can authenticate, is obtained.

6. The apparatus for preventing unauthorized use according to claim 4, wherein the first controller controls the authentication unit to determine an authentication result if the user's input, with which the authentication unit can authenticate, is obtained when a certain time period has passed after a previous authentication result has been determined by the authentication unit.

7. The apparatus for preventing unauthorized use according to claim 4, wherein the first controller controls the authentication unit to determine an authentication result if the user's input, with which the authentication unit can authenticate, is obtained when the most recent stored value indicating the likelihood of the user being the person is lower than a desired threshold.

8. The apparatus for preventing unauthorized use according to claim 1, wherein the second controller compares the most recent stored value indicating the likelihood of the user being the person with, as the certain threshold, a threshold for a service to be conducted by the process instructed to begin, out of thresholds set for every service that the device provides.

9. The apparatus for preventing unauthorized use according to claim 8, wherein the thresholds for every service are determined such that, in relation to the certain function, an amount of time that the most recent stored value takes to decrease to a level, at which execution of a process for each service is refused due to an authentication result not being determined by the authentication unit, is in accordance with safety required for each service.

10. The apparatus for preventing unauthorized use according to claim 8, wherein the certain function is determined such that, in relation to the thresholds for every service, an amount of time that the most recent stored value takes to decrease to a level, at which execution of a process for each service is refused due to an authentication result not being determined by the authentication unit, is in accordance with safety required for each service.

11. The apparatus for preventing unauthorized use according to claim 1, wherein:
the authentication unit determines a plurality of authentication results using a plurality of authentication methods, the plurality of authentication methods including a first authentication method that uses a first kind of user's input into the device and a second authentication method that uses a second, different from the first, kind of user's input into the device and has lower authentication accuracy than the first authentication method; and
the first controller, based on an authentication result determined using the second authentication method, updates the most recent stored value indicating the likelihood of the user being the person, the most recent stored value being updated by the first controller being determined based on an authentication result determined using the first authentication method.

12. The apparatus for preventing unauthorized use according to claim 11, wherein:
the first controller controls the authentication unit to determine an authentication result determined using the first authentication method if the user's first kind of input is made when a first condition is satisfied, and controls the authentication unit to determine an authentication result determined using the second authentication method if the user's second kind of input is made when a second condition is satisfied; and
the first and second conditions are determined such that the first authentication method is used less frequently than the second authentication method.

13. The apparatus for preventing unauthorized use according to claim 1, further comprising a notification unit operable to notify the user of the most recent stored value indicating a likelihood of the user being the person.

14. The apparatus for preventing unauthorized use according to claim 13, wherein the notification unit includes a unit operable to encourage the user to perform an input with which the authentication unit can authenticate when the most recent stored value indicating the likelihood of the user being the person is lower than a desired threshold.

15. The apparatus for preventing unauthorized use according to claim 13, wherein:
the second controller compares the most recent stored value indicating the likelihood of the user being the person with, as the certain threshold, a threshold for a service to be conducted by the process instructed to begin, out of thresholds set for every service that the device provides; and
the notification unit provides the user with a notification that allows the user to distinguish a level of the most recent stored value indicating the likelihood of the user being the person, the level determining a process for which the service is permitted to execute.

16. A method for preventing unauthorized use in a device comprising an authentication module that compares a characteristic obtained from a user's input into the device with a registered characteristic of a person to determine a likelihood of the user being the person, the method comprising:
determining, via the authentication module and as an authentication result, the likelihood of the user being the person, the authentication result being determined based on the comparison;
storing in a memory a value that (i) is determined based on the authentication result, and (ii) indicates the likelihood of the user being the person;
updating, via the authentication module, as a most recent stored value, a previously determined past value stored in the memory and indicating a prior likelihood of the user being the person, the past value being updated based on (i) a present authentication result determined, via the authentication module, from the user's input other than an input performed in response to an input request for authentication, and (ii) the previously determined past value that is stored in the memory and indicates the prior likelihood of the user being the person;

referring to the most recent stored value indicating the likelihood of the user being the person in response to an instruction to begin a process which requires authentication; and controlling whether or not to permit execution of the process depending on whether or not the value referred to is more than a certain threshold, wherein the updating includes, based on a certain function, decreasing the most recent stored value indicating the likelihood of the user being the person as time passes while an authentication result is not determined by the authentication module.

17. The method for preventing unauthorized use according to claim 16, the method further comprising:

determining a new authentication result, via the authentication module, using (i) an input which is performed by the user during a passage of time and is to be used by the device for a purpose other than authentication, or (ii) an input accompanying the user's action for a purpose other than authentication; and increasing, maintaining, or decreasing the most recent stored value indicating the likelihood of the user being the person in accordance with the new authentication result.

18. The method for preventing unauthorized use according to claim 16, the method further comprising permitting execution of the process without requesting the user to input for authentication if the most recent stored value indicating the likelihood of the user being the person has not decreased to a level below the certain threshold.

19. A computer-readable storage medium having a computer program stored thereon, the computer program for preventing unauthorized use of a device comprising an authentication module that compares a characteristic obtained from a user's input into the device with a registered characteristic of a person to determine a likelihood of the user being the person, the computer program causing a computer to execute a method comprising:

determining, via the authentication module and as an authentication result, the likelihood of the user being the person, the authentication result being determined based on the comparison;

storing in a memory a value that (i) is determined based on the authentication result, and (ii) indicates the likelihood of the user being the person;

updating, via the authentication module, as a most recent stored value, a previously determined past value stored in the memory and indicating a prior likelihood of the user being the person, the past value being updated based on (i) a present authentication result determined, via the authentication module, from the user's input other than an input performed in response to an input request for authentication, and (ii) the previously determined past value that is stored in the memory and indicates the prior likelihood of the user being the person;

referring to the most recent stored value indicating the likelihood of the user being the person in response to an instruction to begin a process which requires authentication; and controlling whether or not to permit execution of the process depending on whether or not the value referred to is more than a certain threshold, wherein the updating includes, based on a certain function, decreasing the most recent stored value indicating the likelihood of the user being the person as time passes while an authentication result is not determined by the authentication module.

20. A device with a function of preventing unauthorized use, the device comprising:

an input unit operable to accept a user's input;

a process unit operable to execute an instructed process;

an authentication unit operable to compare a characteristic obtained from an input accepted by the input unit with a registered characteristic of a person, and determine, as an authentication result, a likelihood of the user being the person, the authentication result being determined based on the comparison;

a memory for storing a value that (i) is determined based on an authentication result determined by the authentication unit, and (ii) indicates the likelihood of the user being the person;

a first controller operable to update, as a most recent stored value, a previously determined past value stored in the memory and indicating a prior likelihood of the user being the person, the past value being updated based on (i) a present authentication result determined, by the authentication unit, from the user's input including an input other than an input done in response to an input request for authentication, and (ii) the previously determined past value that is stored in the memory and indicates the prior likelihood of the user being the person; and a second controller operable to, in response to an instruction to begin a process which requires authentication, (i) refer to the most recent stored value indicating the likelihood of the user being the person, and (ii) control whether or not the process unit executes the process depending on whether or not the value referred to is more than a certain threshold, wherein the first controller, based on a certain function, decreases the most recent stored value indicating the likelihood of the user being the person as time passes while an authentication result is not determined by the authentication unit.

21. The device with a function of preventing unauthorized use according to claim 20, wherein (i) a program for realizing the authentication unit and the first and second controller, and (ii) certain data including the registered characteristic of the person, are securely stored in the device, and wherein the most recent stored value indicating the likelihood of the user being the person can only be changed by the first controller.

22. The device with a function of preventing unauthorized use according to claim 20, wherein an input that is accepted by the input unit and can be used for authentication by the authentication unit includes, at least, one of the following: a fingerprint of the user's finger that has touched a button of the device; a sound emitted by the user to a microphone of the device; an image of a body part of the user that is captured by a camera of the device; data inputted into a sensor provided at a part of the device that the user touches to hold the device in the user's hand; the user's keystroke to keys of the device; and information obtained by the device through its communication with an external device in response to the user's action.

* * * * *